United States Patent [19]

Coleman et al.

[11] Patent Number: 4,746,809

[45] Date of Patent: May 24, 1988

[54] AC POWER LINE SIGNALING SYSTEM

[75] Inventors: Charles E. Coleman, Fort Collins; Paul A. Staby, Golden, both of Colo.

[73] Assignee: Pittway Corporation, Northbrook, Ill.

[21] Appl. No.: 925,076

[22] Filed: Oct. 30, 1986

[51] Int. Cl.$^4$ .................. H04M 11/04; H02J 3/02; H02J 1/00
[52] U.S. Cl. .......................................... 307/1; 307/3; 340/310 A; 340/310 CP
[58] Field of Search ................. 307/1, 3, 114, 116; 340/696, 310 R, 310 A, 310 CP, 825.5; 367/903

[56] References Cited

U.S. PATENT DOCUMENTS

| | | | |
|---|---|---|---|
| 3,670,182 | 6/1972 | Konno et al. | 307/293 |
| 3,922,563 | 11/1975 | Penman | 307/116 |
| 4,024,528 | 5/1977 | Boggs et al. | 340/310 A |
| 4,200,862 | 4/1980 | Campbell et al. | 307/3 X |
| 4,292,546 | 9/1981 | Clark | 307/114 |
| 4,300,126 | 11/1981 | Gajjar | 340/310 A |

Primary Examiner—William M. Shoop, Jr.
Assistant Examiner—Sharon D. Logan
Attorney, Agent, or Firm—Dressler, Goldsmith, Shore, Sutker & Milnamow, Ltd.

[57] ABSTRACT

A system for controlling the operation of a load circuit coupled to an AC power distribution circuit includes an encoder which may be mounted in a wall switch box and coupled to a single conductor of the AC power distribution circuit for imposing thereon control signals by lengthening the zero crossings of the AC voltage. A decoder, also connected to the AC power distribution circuit at a remote location, detects the lengthened zero crossings and closes an electronic switch for energizing the load circuit. The encoder may be disconnected from the AC power distribution circuit, in which case the load circuit may be controlled by an external condition responsive device, such as a passive IR sensor. Visible light-responsive means may be provided for disabling the IR sensor during the day. The load circuit and the decoder can be turned off from the encoder location.

20 Claims, 2 Drawing Sheets

AC POWER LINE SIGNALING SYSTEM

BACKGROUND OF THE INVENTION

The present invention relates to signaling systems for communication between remote locations. The invention has particular application to remote control systems of the type which effects signaling over an AC power distribution circuit.

Conventionally, electrical appliance control within or around a building is achieved simply by the use of the existing power main together with switches at fixed locations and switches on the appliances. Remote control is not conventionally available other than by the use of switches at the fixed locations, or by local condition-responsive control of the switch on the appliance, such as, e.g., ultrasonic links directly to a television receiver, or timer-controlled automatic switches.

It is known to provide remote control of an appliance by signaling over the AC power lines, but such systems typically require access to both conductors of the AC power distribution circuit. Furthermore, most such systems require the generation of a separate modulated carrier signal to be impressed on the power line, such systems being disclosed, for example, in U.S. Pat. Nos. 4,200,862 and 4,300,126. It is also known to effect power line signaling by modulation of the AC power waveform itself, such a system being disclosed in U.S. Pat. No. 4,024,528. But that system also requires the generation of separate control signals to be superimposed on the AC voltage waveform. U.S. Pat. No. 4,292,546 teaches remote control of an appliance connected to the AC power line by momentary interruption of the AC power, which interruption is detected by a unit at the appliance to reverse the condition of its power switch. But such a system also momentarily interrupts power to any other device which may be connected to the AC circuit. This limits the utility of the system, since some AC-power devices would be adversely affected by such momentary power interruptions. Furthermore, 211 of these prior systems which effect signaling by some alteration of the AC power signal require access to both conductors of the AC line.

SUMMARY OF THE INVENTION

It is a general object of the invention to provide an improved signaling system which avoids the disadvantages of prior systems, while affording additional structural and operating advantages.

An important feature of the invention is the provision of an improved system for AC power line signaling by alteration of the shape of the AC voltage waveform.

In connection with the foregoing feature, it is another feature of the invention to provide a signaling system of the type set forth which effects signaling by lengthening of the zero crossings of the AC voltage waveform.

Still another feature of the invention is the provision of a signaling system of the type set forth which provides unique decoder means at a remote receiving station for detecting the AC waveform modifications.

Another feature of the invention is the provision of a signaling system of the type set forth which is coupled to a load circuit for controlling the operation thereof.

Still another feature of the invention is the provision of a signaling system of the type set forth which includes means for selectively switching the control of the load circuit between the AC signaling system and a condition-responsive device.

These and other features of the invention are attained by providing a system for electrical signaling over an AC power distribution circuit carrying a periodic AC voltage having a positive zero crossing and a negative zero crossing during each cycle, said system comprising: transmitter means coupled to the AC power distribution circuit for imposing control signals thereon by increasing the duration of at least one zero crossing in each cycle of the AC voltage, and receiver means coupled to the AC power distribution circuit for detecting said control signals.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
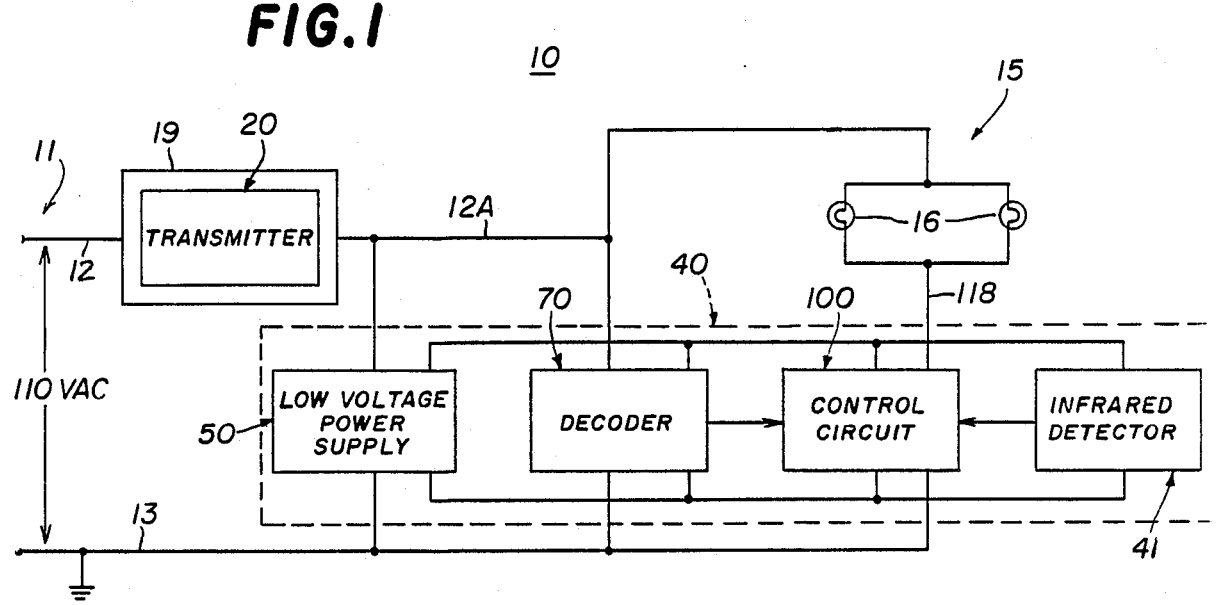
FIG. 1 is a part-schematic and part-block diagram of a signaling system constructed in accordance with and embodying the features of the present invention.

Referring to FIG. 1, there is illustrated a communication system, generally designated by the numeral 10, constructed in accordance with and embodying the features of the present invention. The system 10 is disclosed in a configuration to selectively provide remote control or local condition-responsive control of a load circuit 15. The system 10 has been disclosed in the context of an intrusion detection system, but it will be appreciated that the principles of the present invention could be utilized in other applications.

The communication system 10 is designed for communication over an AC power distribution circuit 11, which may be a common 110 VAC, 60 Hz household power circuit. The circuit 11 typically includes a hot conductor 12 and a ground conductor 13, which provide power to the load circuit 15, which preferably includes a controlled device. In the disclosed embodiment, the controlled device is a pair of parallel-connected outdoor lamps 16 which may, for example, be security lights.

The system 10 includes a transmitter 20, which may be mounted in a standard wall switch box 19, and a receiver 40. While the transmitter 20 and the receiver 40 have been illustrated adjacent to each other in FIG. 1, it will be appreciated that, in practice, the receiver 40 will typically be located close to the load circuit 15, and the transmitter 20 will typically be located at a remote location. The receiver 40 is connected across the conductors 12 and 13 of the AC power distribution circuit 11. However, it is a significant aspect of the invention that the transmitter 20 need be connected to only a single one of the conductors 12 or 13, whereby access to only a single conductor is necessary at the wall switch box 19. In FIG. 1 the transmitter 20 is shown connected to conductor 12. It will be appreciated that conductor 12 is broken at the wall switch box 19 and the two ends (designated 12 and 12A) are respectively connected to corresponding terminals of the transmitter 20.

The receiver 40 includes a suitable external condition-responsive device for controlling operation of the load circuit 15, this condition-responsive device being an infrared detector 41 in the illustrated embodiment. The infrared detector 41 may include an IR sensor module 45 and an associated sensitivity adjustment potentiometer 46 (see FIG. 3). The receiver 40 also includes a low voltage power supply 50, connected across the conductors 12A and 13 of the AC power distribution circuit 11, for providing low DC supply voltages to the infrared detector 41, as well as to a decoder 70 and a control circuit 100, which also form part of the receiver 40. The decoder 70 is connected across the conductors of the AC power distribution circuit 11, while the control circuit 100 is connected in series with the load circuit 15. Output signals from the infrared detector 41 and the decoder 70 are applied to the control circuit 100 for controlling the operation thereof.

Figure 2:
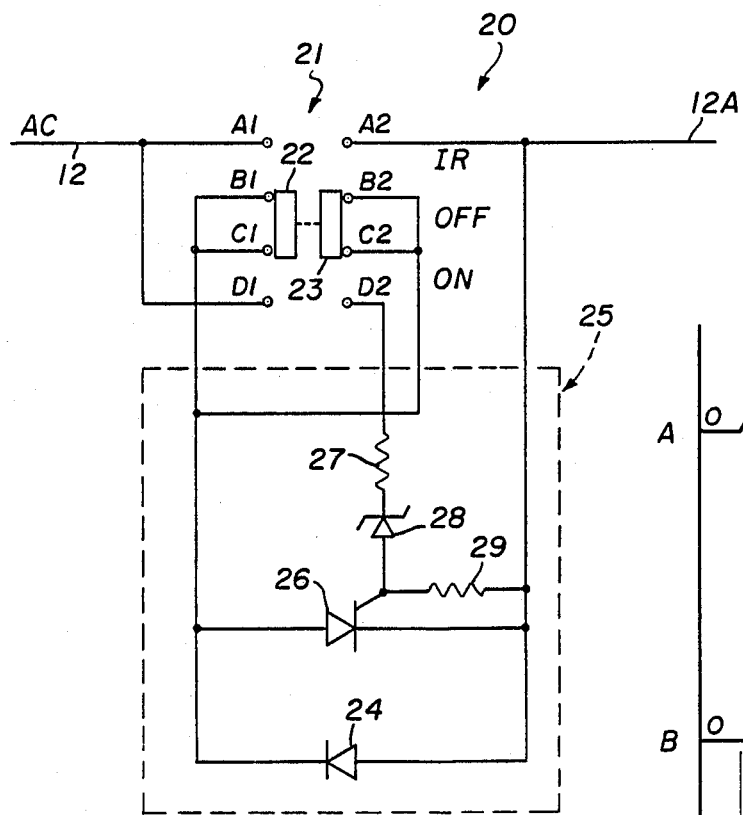
FIG. 2 is a schematic circuit diagram of the transmitter of the system of FIG. 1.

Referring to FIG. 2, the transmitter 20 includes a double-pole, triple-throw switch 21 which has a pair of movable contacts 22 and 23 insulated from each other, and four sets of fixed contacts A1 and A2, B1 and B2, C1 and C2, and D1 and D2. The fixed contacts A1 and A2 are, respectively, connected to the conductors 12 and 12A. The fixed contacts B1 and C1 are connected to each other and to the fixed contacts B2 and C2. The fixed contact D1 is connected to the AC supply conductor 12. The switch 21 is movable among three positions: an OFF position, illustrated in FIG. 2, wherein the contact 22 bridges the contacts B1 and C1 and the contact 23 bridges contacts B2 and C2; an IR position, wherein the contact 22 bridges the contacts A1 and B1 and the contact 23 bridges the contacts A2 and B2; and an ON position wherein the contact 22 bridges the contacts C1 and D1 and the contact 23 bridges the contacts C2 and D2.

The transmitter 20 also includes an encoder, generally designated by the numeral 25, which includes two parallel-connected and oppositely-poled unidirectional current devices, such as a diode 24 and a silicon controlled rectifier ("SCR") 26. The cathode of the diode 24 and the anode of the SCR 26 are connected to the terminals B1, B2, C1 and C2 of the switch 21, while the anode of the diode 24 and the cathode of the SCR 26 are connected to the conductor 12A. The fixed contact D2 of the switch 21 is connected through a resistor 27 to the cathode of a Zener diode 28, the anode of which is connected to the gate terminal of the SCR 26. This gate terminal is also connected through a resistor 29 to the conductor 12A.

In operation, when the switch 21 is in its OFF position, illustrated in FIG. 2, the encoder 25 and the load circuit 15 are disconnected from the AC power distribution circuit 11. When the switch 21 is moved to its IR position, the load circuit 15 is connected to the AC power distribution circuit 11 through the contacts A1, 22, B1, B2, 23 and A2 of the switch 21. However, the encoder 25 remains disconnected from the AC power distribution circuit 11. In this condition, the load circuit 15 is under the control of the control circuit 100 and the infrared detector 41, as will be explained more fully below.

When the switch 21 is moved to its ON position, the load circuit 15 is connected to the AC power distribution circuit 11 through the encoder 25. In this condition, the encoder 25 sends encoded signals along the AC power distribution circuit 11, which signals are decoded by the decoder 70, for causing the control circuit 100 to energize the load circuit 15 independently of the infrared detector 41, in a manner to be explained more fully below. Thus, by moving the switch 21 between the OFF and ON positions, the user can selectively turn the lamps 16 off and on from the remote location of the transmitter 20, regardless of the condition of the infrared detector 41.

Figure 4:
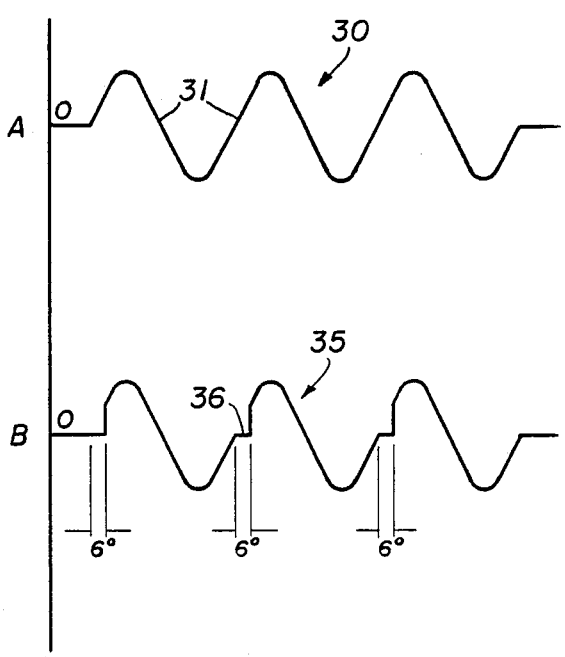
FIGS. 4A and B are waveform diagrams showing, respectively, the AC voltage waveform unaltered and as modified by the transmitter of FIG. 1.

Referring to FIG. 4, the operation of the encoder 25 will be explained. When the switch 21 is in its IR position, an unmodulated 110 VAC waveform 30 will be transmitted along the conductor 12 to energize the load circuit 15 when an electronic switch (to be described below) in the control circuit 100 is closed. This waveform 30 has positive- and negative-going "zero crossings" 31 during each cycle, i.e., points at which the waveform passes through the 0-volt or ground level. These zero crossings occur virtually instantaneously, and the decoder 70 does not respond to them.

When the switch 21 is in the ON position, AC power is applied to the diode 24 and the SCR 26 via the contacts D1, 22 and C1 of the switch 21. The AC voltage is also applied through the contacts C2, 23 and D2 of the switch 21 to the gate electrode of the SCR 26 through the resistor 27 and the Zener diode 28. Thus, it will be appreciated that during the half cycle of the AC waveform when the anode of the SCR 26 is positive with respect to its cathode, it will conduct when it is gated on. This turn on of the SCR 26 is delayed by the amount of time necessary for the AC voltage to rise to the break over voltage of the Zener diode 28, which is approximately 6° of the AC voltage waveform 35. At this point, the Zener diode 28 and the resistor 27 begin to provide a current to the gate of the SCR 26 to turn it on a predetermined time after the zero crossing of the AC waveform, providing the essentially lengthened zero crossing 36, illustrated in FIG. 4B. The SCR 26 continues to conduct throughout the remainder of the positive half cycle of the AC voltage waveform 35. In the other half cycle, the diode 24 conducts, providing nearly full power to the load circuit 15.

Thus, it will be appreciated that the encoder 25 serves to lengthen each positive-going zero crossing of the AC voltage waveform by a predetermined amount, which is detectable by the decoder 70. If desired, an SCR could also be substituted for the diode 24, to provide lengthening of both the negative-going and positive-going zero crossings of the AC voltage waveform. When the switch 21 is moved from the ON position the encoder 25 is turned off. The resistor 29 insures that stray leakage current through the Zener diode 28 will not keep the SCR 26 on when the switch 21 is moved to the IR position.

Figure 3:
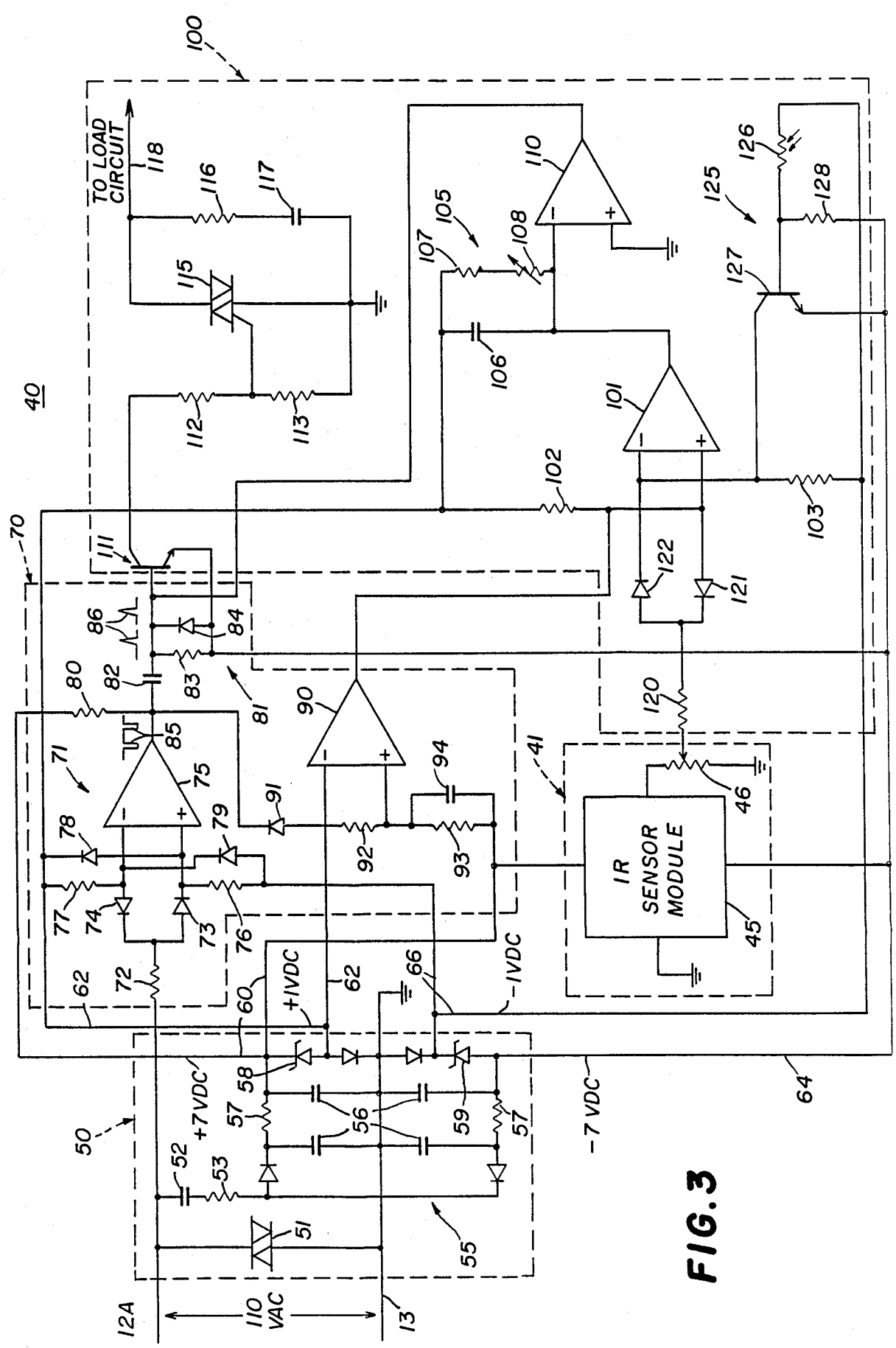
FIG. 3 is a schematic circuit diagram of the receiving of the system of FIG. 1.

Referring now also to FIG. 3 of the drawings, the receiver 40 will be described. The low voltage power supply 50 includes a varistor 51 connected across the AC conductors 12A and 13 for transient suppression.

The AC voltage is connected through a coupling capacitor 52 and a resistor 53 to a full wave rectifying diode bridge 55, which is also provided with a filter circuit including capacitors 56 and resistors 57. Also connected in the output legs of the diode bridge 55 are Zener diodes 58 and 59. It will be appreciated that the power supply 50 provides a first positive supply voltage (preferably about +7 VDC) at the cathode of the Zener diode 58, on conductors 60, and a corresponding negative supply voltage at the anode of the Zener diode 59, on conductor 64. The power supply 50 also produces a second positive supply voltage (preferably approximately +1 VDC) at the anode of the Zener diode 58, on conductors 62, and a corresponding negative DC supply voltage at the cathode of the Zener diode 59, on the conductors 66.

The decoder 70 includes a zero crossing detector, generally designated by the numeral 71, which includes a resistor 72 connected in series with the AC conductor 12A and, in turn, connected to the anode of a diode 73 and to the cathode of a diode 74. The cathode of the diode 73 is connected to the non-inverting input of a comparator 75, while the anode of the diode 74 is connected to the inverting input of the comparator 75. These two inputs of the comparator 75 are also, respectively, connected to the −1 VDC and the +1 VDC supplies by resistors 76 and 77. The non-inverting input is also connected to the anode of a diode 78, the cathode of which is connected to the +1 VDC supply, while the inverting input is connected to the cathode of a diode 79, the anode of which is connected to the −1 VDC supply. The output of the comparator 75 is connected to the +7 VDC supply through the resistor 80. Preferably, the comparator 75, as well as the comparators 90, 101 and 110, to be described below, are formed as part of a common integrated circuit. While not illustrated in the drawing, it will be appreciated that this integrated circuit is suitably coupled to the +7 VDC and −7 VDC supply voltages.

In operation, when no AC voltage is applied to the zero crossing detector 71, the coupling of the +1 VDC supply to the inverting input via resistor 77 (and isolation from the non-inverting input by the diode 78), and the coupling of the −1 VDC supply to the non-inverting input via the resistor 76 (and isolation from the inverting input by the diode 79), serves to hold the output of the comparator 75 at −7 VDC, in a known manner.

When AC voltage is applied to the diodes 73 and 74 through the resistor 72 (such as when the transmitter switch 21 is in its IR position), the output of the comparator 75 will be held at +7 VDC, except in the vicinity of the zero crossings, when it will be switched to −7 VDC. More particularly, during most of the positive half of the AC waveform, the diode 73 will be forward biased, applying positive voltage to the non-inverting input of the comparator 75, holding its output positive, while during most of the negative half cycle the diode 74 will be forward biased, applying a negative voltage to the inverting input of the comparator 75, which is inverted to hold the output positive. But the diode 73 does not become forward biased until the AC voltage goes positive by about 0.6 or 0.7 volts and, similarly, the diode 74 does not become forward biased until the AC voltage goes negative by about 0.6 or 0.7 volts. Thus, there is a brief period of time immediately following each zero crossing when neither diode 73 nor diode 74 is forward biased, at which points the bias voltages applied by the resistors 76 and 77 drive the output of the comparator 75 to −7 VDC. Thus, there is produced at the output of the comparator 75 a brief negative-going pulse 85 at each zero crossing of the AC voltage waveform.

The negative-going output pulses from the comparator 75 are applied to a differentiating circuit 81, including a capacitor 82, a resistor 83 and a diode 84, producing a positive-going pulse 86 in response to each negative pulse. These positive pulses are applied to the control circuit 100 for a purpose to be explained below.

The decoder 70 also includes a comparator 90, the inverting input of which is connected to the +1 VDC supply and the non-inverting input of which is connected to the +7 VDC supply by a parallel-connected resistor 93 and capacitor 94. The output of the comparator 75 is connected to the cathode of a diode 91, the anode of which is connected through a resistor 92 through the non-inverting input of the comparator 90.

Normally, when there is no AC applied, it is apparent that the output of the comparator 90 will be held at +7 VDC. When AC is applied, but the encoder 25 is disconnected (such as when the transmitter switch 21 is in its IR position), during each negative output pulse 85 from the comparator 75, the diode 91 will draw current through the resistor 92 to charge the capacitor 94. At the termination of the pulse 85, the capacitor 94 will discharge through the resistor 93. When non-encoded AC is applied, the length of the output pulses 85 from the comparator 75 is insufficient to charge the capacitor 94 to a high enough voltage to cause the output of the comparator 90 to go low.

However, when the encoder 25 is turned on (when transmitter switch 21 is in its ON position), the lengthened zero crossings of the AC waveform will cause a corresponding lengthening of the output pulses 85 from the comparator 75. The lengthened pulses will permit the capacitor 94 to charge to a higher voltage, sufficient to switch the output comparator 90 to −7 VDC. The discharge time constant of the resistor 93 and the capacitor 94 is such that the capacitor 94 cannot discharge between output pulses 85 from the comparator 75 sufficiently to allow the output of the comparator 90 to switch back high. Thus, its output is held low for as long as the encoder 25 is operated.

The output of the comparator 90 is coupled to the control circuit 100. More particularly, the control circuit 100 includes a comparator 101, the non-inverting input of which is connected to the output of the comparator 90. The non-inverting and inverting inputs of the comparator 101 are also, respectively, coupled via resistors 102 and 103 to the +1 VDC and −1 VDC supplies. Thus, normally, the output of the comparator 101 will be held high. The output of the comparator 101 is connected to a time delay circuit 105 and to the inverting input of a comparator 110. The time delay circuit 105 includes a capacitor 106 connected between the +1 VDC supply and the inverting input of the comparator 110, the capacitor 106 being connected in parallel with a series combination of a resistor 107 and a potentiometer 108. The non-inverting input of the comparator 110 is connected to ground.

The output of the comparator 110 is connected to the base of a transistor 111, the emitter of which is connected to the −7 VDC supply. The resistor 83 and the diode 84 of the differentiating circuit 81 are connected in parallel across the base-emitter junction of the transistor 111. The collector of the transistor 111 is connected to ground through a voltage divider comprising the resistors 112 and 113, the junction therebetween being connected to the gate electrode of a triac 115 connected in series with the load circuit 15 via a conductor 118. Connected across the triac 115 is a transient-suppression circuit comprising the series-connected resistor 116 and capacitor 117.

In operation, when the output of the comparator 101 is in its normal high condition, the output of the comparator 110 is held low, holding the transistor 111 nonconductive and preventing passage of the pulses 86 to the triac 115, which remains essentially open-circuited, holding the load circuit 15 deenergized. When the encoder 25 is operated to produce lengthened zero crossings, the $-7$ VDC output from the comparator 90 overrides the small positive voltage being applied to the non-inverting input of the comparator 101 via the resistor 102, for causing the output of the comparator 101 to go low, thereby charging the capacitor 106 to $-8$ volts, causing the output of the comparator 110 to go high. The high on the base of the transistor 111 renders it conductive, to pass the pulses 86 to the gate electrode of the triac 115, gating it on twice during each cycle of the AC voltage waveform, or 120 times per second, thereby turning on the load circuit 15.

When the encoder 25 is turned off, the output of the comparator 90 goes back high, causing the output of the comparator 101 to go high, allowing the capacitor 106 to discharge through the resistor 107 and the potentiometer 108. The time constant of the time delay circuit 105 can be adjusted by the user by adjustment of the potentiometer 108 in a range of from about 3 or 4 seconds to about 15 minutes. Thus, after the output of the comparator 101 goes high, the output of the comparator 110 will remain high and the load circuit 15 will remain energized for the time delay period. When the capacitor 106 has discharged, the output of the comparator 110 will go back low, turning off the resistor 112 and the triac 115 to deenergize the load circuit 15.

When the transmitter switch 20 is in its IR position, the load circuit 15 is under the control of the infrared detector 41. In particular, the IR sensor module 45 may be a commercially available device which detects infrared radiation. In the disclosed embodiment of the present invention, the sensor module 45 is utilized as an intrusion detector, for detecting the presence of living bodies passing within the range of the sensor module 45. Such a presence causes the output of the sensor module 45 to go either high or low, the output signal being applied by the potentiometer 46 and the resistor 120 to the inputs of the comparator 101 through the diodes 121 and 122. The sensitivity of the IR sensor module 45 can be manually adjusted by the user by means of the potentiometer 46.

If the output of the IR sensor module 45 goes high, the diode 122 will be forward biased, applying a positive voltage to the inverting input of the comparator 101, causing its output to go low. Similarly, if the output of the IR sensor module 45 is low, the diode 121 will be forward biased, applying a negative voltage to the non-inverting input of the comparator 101, which also causes its output to go low. Thus, any output signal from the IR sensor module 45, whether positive or negative, will serve to energize the load circuit 15 in the manner described above. Typically, the output signal from the IR sensor module 45 will persist as long as the intruding body is still within range of the sensor module 45. When the output signal from the IR sensor module 45 ceases, the load circuit 15 will be deenergized after the time delay period of the time delay circuit 105.

If desired, a light sensing circuit 125 may be provided to disable the infrared detector 41 during the daytime and enable it only at night. The light sensing circuit 125 includes a photoresistor 126 connected between the $-1$ VDC supply and the base of a transistor 127, the collector of which is connected to the inverting input of the comparator 101, and the emitter of which is connected to the $-7$ VDC supply. A resistor 128 is connected across the base-emitter junction of the transistor 127.

In operation, during the day the photoresistor 126 has a very low resistance, so that there will be a sufficient current on the base of the transistor 127 to render it conductive, thereby placing $-7$ VDC on the inverting input of the comparator 101, holding its output high. This input voltage is significantly greater than any output signal which can be obtained from the infrared detector 41, thereby essentially overriding and disabling it. At night the photoresistor 126 has a high resistance, turning off the transistor 127 and thereby returning the comparator 101 to control by the infrared detector 41.

It is noted that, while the light sensing circuit 125 cannot be overriden by the infrared detector 41 during the daytime, it can be overriden by the encoder 25. Thus, when the encoder 25 is operated, the $-7$ VDC output from the comparator 90 will cause a relatively high current to be applied to the non-inverting input of the comparator 101 sufficient to cause its output to go low. Thus, a user can selectively turn on the load circuit 15 by use of the encoder 25, even during the daytime.

From the foregoing, it can be seen that there has been provided an improved signaling system which effects signaling over an AC power distribution circuit, while necessitating access to only a single conductor of the AC circuit at the transmitting end. More particularly, there has been provided a communication system which effects selective transfer of the control of a load circuit between a remote transmitting station and a local condition-responsive device. The signaling is effected by a unique modulation of the AC voltage waveform by lengthening the zero crossings thereof.

We claim:

1. A system for electrical signaling over an AC power distribution circuit carrying a periodic AC voltage having a positive zero crossing and a negative zero crossing during each cycle, said system comprising: transmitter means coupled to the AC power distribution circuit for imposing control signals thereon solely by increasing the duration of at least one zero crossing in each cycle of the AC voltage, and receiver means coupled to the AC power distribution circuit for detecting said control signals.

2. The system of claim 1 wherein said transmitter means increases the duration of only one zero crossing in each cycle of the AC voltage.

3. The system of claim 2, wherein said transmitter means increases the duration of only the positive zero crossing in each cycle of the AC voltage.

4. The system of claim 1, wherein said transmitter means includes two oppositely directed unidirectional current devices connected in parallel with each other and in series with the AC power distribution circuit, and control means coupled to at least one of said unidirectional current devices for delaying the time during each cycle of the AC voltage when said device becomes conductive.

5. The system of claim 4, wherein said one unidirectional current device is a silicon controlled rectifier and the other of said devices is a diode, said control means comprising a Zener diode circuit connected to the gate electrode of said silicon controlled rectifier.

6. The system of claim 1, wherein said transmitter means includes encoder means for increasing the duration of zero crossings in the AC voltage, and switch means having first and second positions for respectively connecting and disconnecting said encoder means.

7. The system of claim 6, wherein said switch means has a third position for selectively disconnecting said receiver means from the AC power distribution circuit.

8. The system of claim 1, wherein said transmitter means is coupled to only one conductor of the AC power distribution circuit.

9. A system for controlling a load circuit connected to an AC power distribution circuit carrying a periodic AC voltage having a positive zero crossing and a negative zero crossing during each cycle, said system comprising; electrically operated switch means connected in series with the load circuit and operative in response to an actuating signal to establish a conductive circuit between said power distribution circuit and said load circuit, encoder means coupled to the AC power distribution circuit for imposing control signals thereon solely by increasing the duration of at least one zero crossing in each cycle oof the AC voltage, decoder means coupled to the AC power distribution circuit for detecting said control signals and producing an output signal in response thereto, and actuating means responsive to said output signal for applying said actuation signal to said switch means.

10. The system of claim 9, wherein said load circuit includes outdoor lights.

11. The system of claim 9, wherein said decoder means includes zero crossing detection means responsive to zero crossings of the AC voltage for producing output signals which vary as a function of the duration of said zero crossings.

12. The system of claim 11, wherein said decoder means includes comparator means responsive to increased duration zero crossings for producing said output signal.

13. The system of claim 9, and further comprising DC supply means coupled to said AC power distribution circuit and producing DC voltages for said decoder means and said actuating means.

14. A system for controlling a load circuit connected to an AC power distribution circuit carrying a periodic AC voltage having a positive zero crossing and a negative zero crossing during each cycle, said system comprising: electrically operated switch means connected in series with the load circuit and operative in response to an actuating signal to establish a conductive circuit between said power distribution circuit and said load circuit, encoder means coupled to the AC power distribution circuit for imposing control signals thereon solely by increasing the duration of at least one zero crossing in each cycle of the AC voltage, decoder means coupled to the AC power distribution circuit for detecting said control signals and producing a first output signal in response thereto, condition sensing means responsive to a predetermined external condition for producing a second output signal, and actuating means coupled to said decoder means and to said condition responsive means and responsive to either of said first or second output signals for applying said actuating signal to said switch means.

15. The system of claim 14, wherein said condition responsive means includes infrared sensing means.

16. The system of claim 14, and further comprising enabling means coupled to said condition responsive means for controlling the enablement thereof.

17. The system of claim 16, wherein said enabling means comprises visible light-responsive means for disabling said condition responsive means during daylight and for enabling said condition responsive means at night.

18. The system of claim 14, wherein said first output signal is operable for disabling said condition responsive means.

19. The system of claim 14, and further comprising encoder switch means coupled to said encoder means and operable between first and second conditions for respectively connecting and disconnecting said encoder means.

20. The system of claim 19, wherein said encoder switch means is operable to the third position for disconnecting the load circuit and said decoder means from the AC power distribution circuit.

* * * * *

UNITED STATES PATENT AND TRADEMARK OFFICE
CERTIFICATE OF CORRECTION

PATENT NO. : 4,746,809
DATED : May 24, 1988
INVENTOR(S) : Charles E. Coleman & Paul A. Staby It is certified that error appears in the above-identified patent and that said Letters Patent is hereby corrected as shown below:

Column 1, line 43:

The word "211" should be --all--.

Column 2, line 35:

The word "receiving" should be --receiver--.

Column 7, line 38:

The words "resistor 112" should be --transistor 111--.

Claim 9, line 21:

";" should be --:--.

Claim 9, line 28:

"oof" should be --of--.

Signed and Sealed this

Fifteenth Day of November, 1988

*Attest:*

DONALD J. QUIGG

*Attesting Officer*   *Commissioner of Patents and Trademarks*